Nov. 14, 1961 R. H. PARK 3,008,191
METHOD FOR BLOW MOLDING HOLLOW ARTICLES
Filed July 14, 1954 4 Sheets-Sheet 1

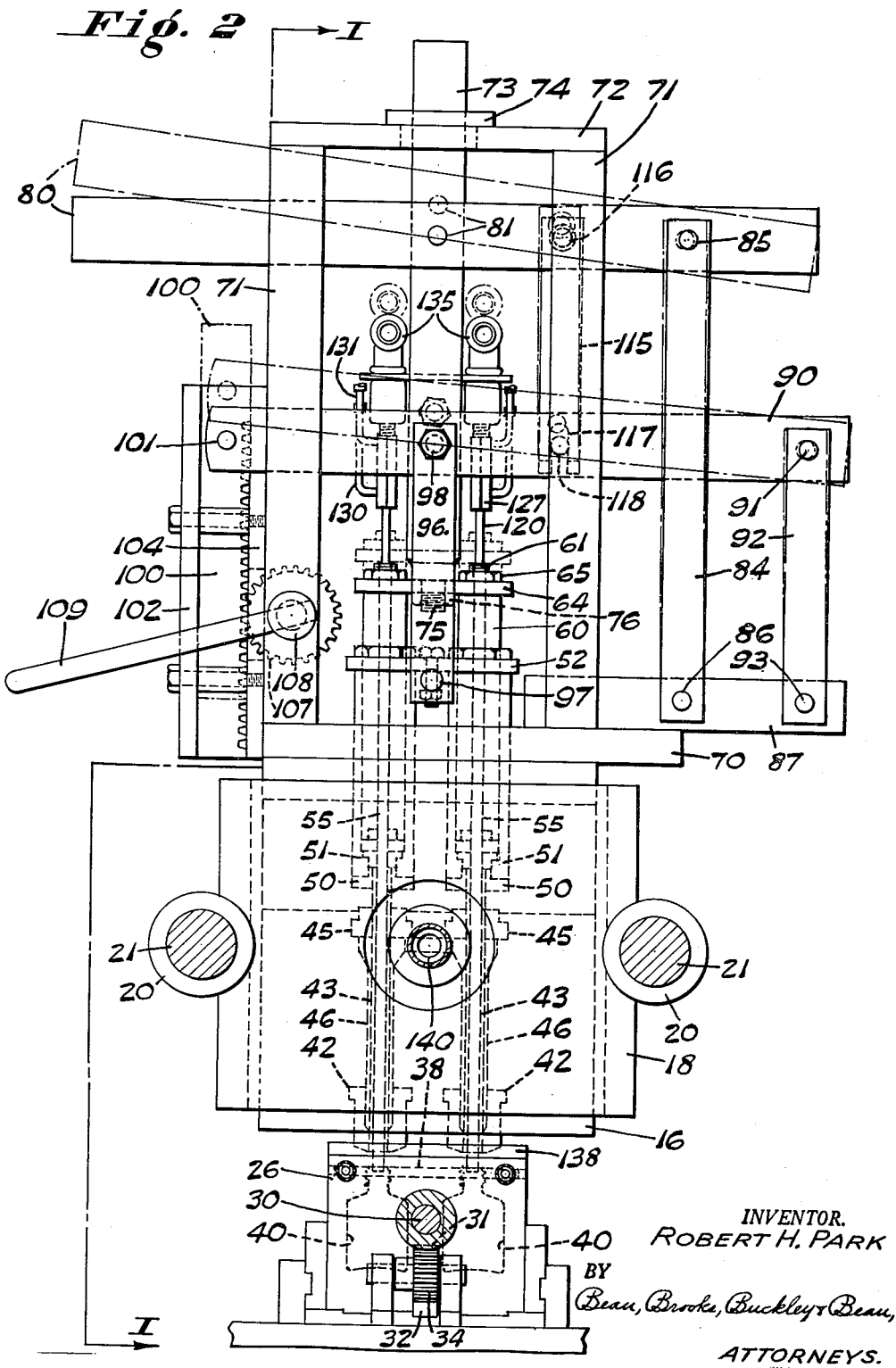

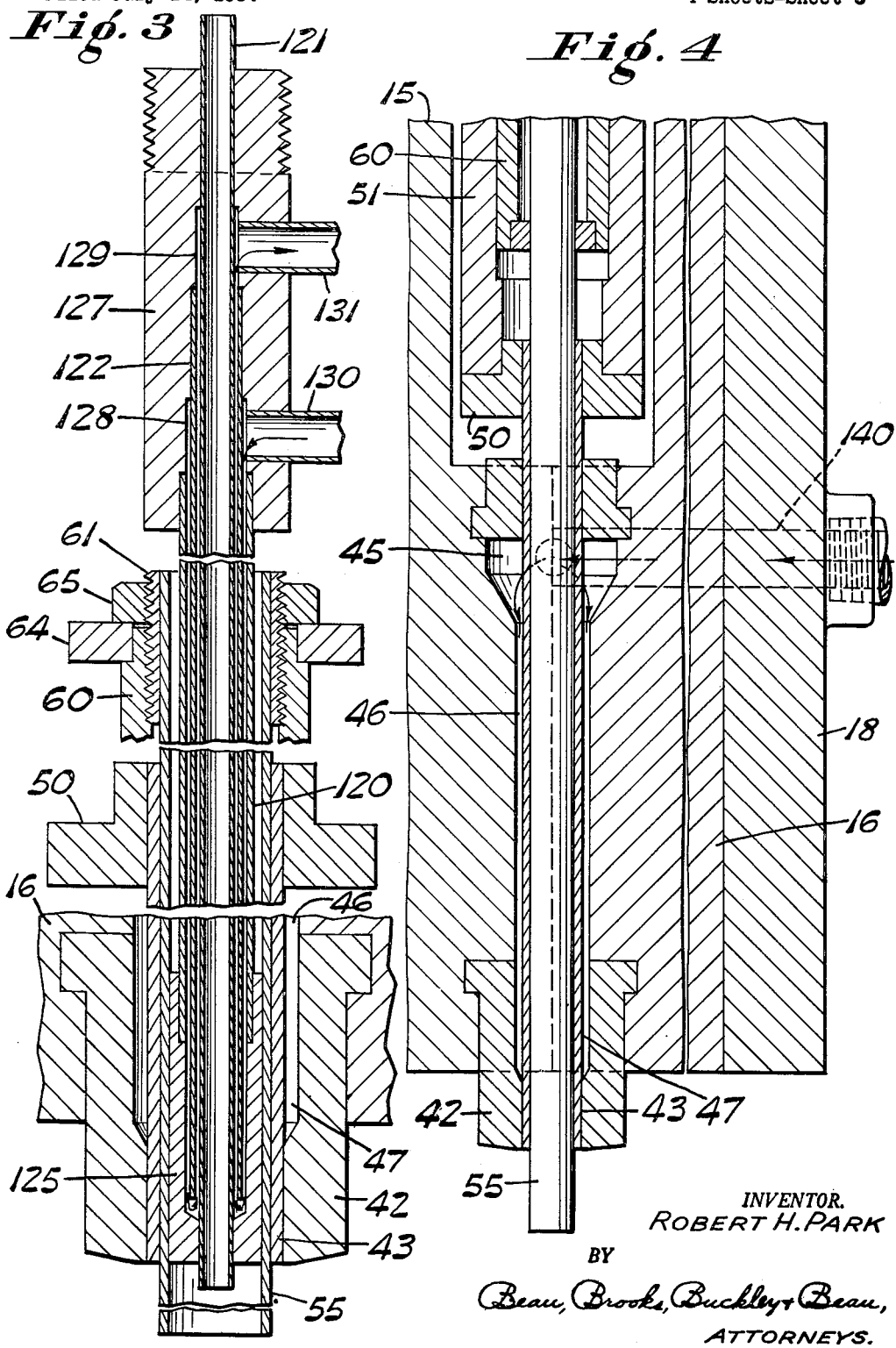

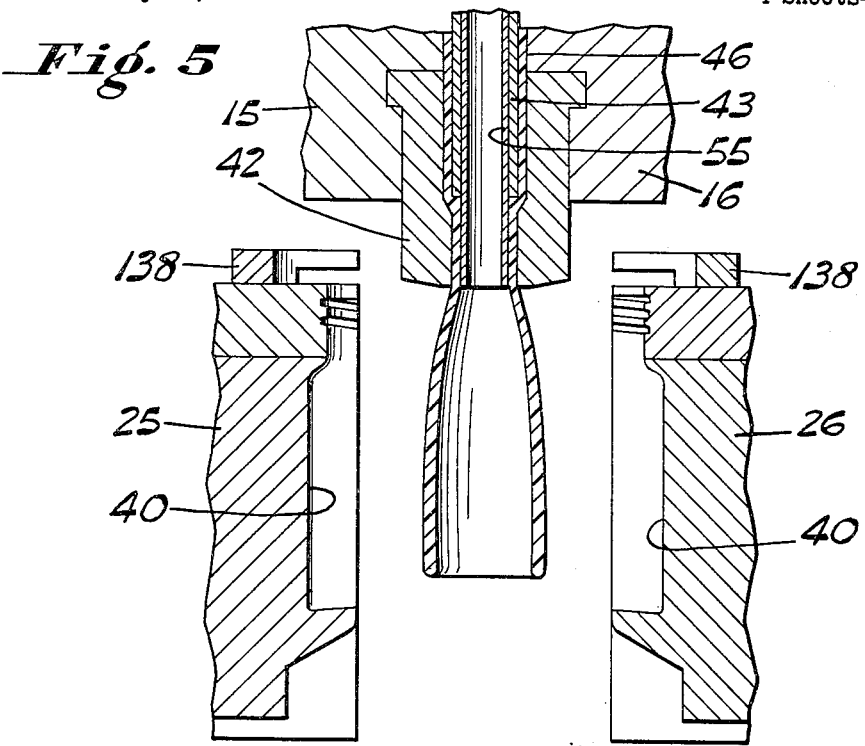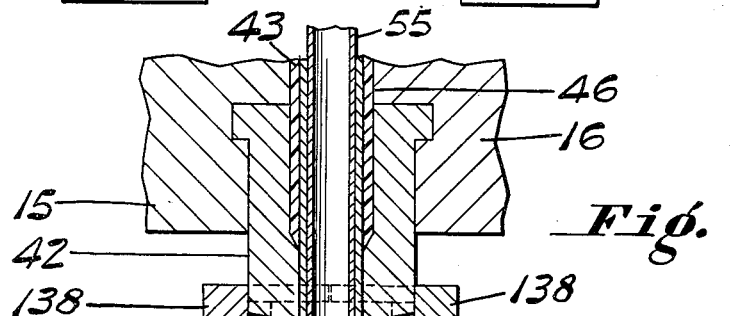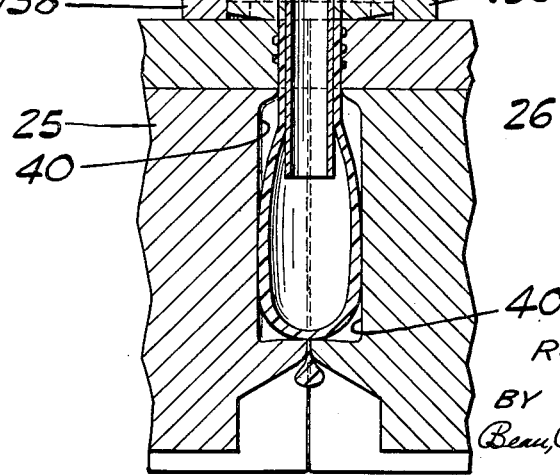

United States Patent Office 3,008,191
Patented Nov. 14, 1961

3,008,191
METHOD FOR BLOW MOLDING
HOLLOW ARTICLES
Robert H. Park, Dennis, Mass., assignor to Brockway
Glass Company, Inc., Brockway, Pa.
Filed July 14, 1954, Ser. No. 443,272
11 Claims. (Cl. 18—55)

This invention relates to a method of forming hollow plastic articles, such as thermoplastic containers, by a combination of forming and blowing steps.

In general, the method of the present invention relates to the production of thermoplastic bottles by extruding a thermoplastic blank or parison in tubular form and in a plastic condition, pinching the leading end of the plastic tube to close the same or closing such leading end by other means, and then introducing air pressure within the closed ended tube to expand the same into a mold cavity of the shape of the desired exterior shape of the container.

An important feature of the present invention resides in the method by which the partially formed container or material for forming such a container is separated from the parent body of plastic material. Further, and in conjunction with such novel severance of the material, there is provided a novel method for finish forming the entrance end of the container, usually referred to in this art as the "finish" of the container. The method employed in this connection are such that a minimum of extraneous finishing or trimming steps are necessary.

A further important feature of the present invention comprises a novel method for controlling the development, formation, and ultimate configuration of the tubular extrusion from which the article is finally formed and for properly locating the extrusion in and relative to the mold devices. The phenomenon of elastic memory which is encountered in extruding or otherwise forming thermoplastic material is known to those skilled in the present art and presents certain problems which greatly complicate the provision of a satisfactory method and apparatus for the commercial production of plastic containers or like articles.

As a result of elastic memory an extruded tube of plastic material will substantially enlarge as it emerges from the extrusion orifice, at least it will do so when the plastic is fed or brought to the extrusion passage in the usual manner by feeding from a larger annular passageway. A further natural and predictable result of the generally known and practical methods of plastic extrusion is the development of an extruded body which, in addition to being of greater lateral dimension, is proportionately shorter in length. That is, the length of a given extrusion is less than the actual length of the plastic material which passes the extrusion orifice in producing such extrusion, the shortening taking place with and as a part of the increase in lateral dimension.

I have found that these conditions can be controlled, counteracted and, in fact, be made to serve a useful purpose, by certain methods and apparatus which, in the present example, comprises a part of the extrusion and blowing means and method.

A further object of the present invention is the provision of a molding procedure which simplifies the extrusion and molding apparatus by reason of which the apparatus is not only simpler and more economical to build but is also more easily maintained and is more readily cleaned when cleaning is necessary. Forming and molding apparatus constructed according to the present invention may be of a type for use in a standard commercial injection molding machine or may be incorporated in a special machine adapted particularly to suit the purposes of the present invention, without varying the novel principles of the present invention.

A still further object of the present invention is the provision of more adequate control of heat so that, among other things, the overall time cycle for reaching a fully or sufficiently rigidified molded article is less than in comparable apparatus for forming articles of this general class. The present molding apparatus also provides better means for local heating or cooling whereby certain parts of the apparatus may be effective to retard loss of heat in the plastic material whereas other parts are effective to promote cooling, all as desired or indicated by various operating conditions.

Numerous other objects and advantages of the method and apparatus of the present invention will become apparent to those skilled in the present art from a consideration of the following detailed specification and the accompanying drawings. However, it is to be understood that the form of the present invention herein set forth is by way of example only and that the principles of the present invention are not limited thereto, or otherwise than as defined in the appended claims.

In the drawings:

FIG. 2 is an elevational view of the apparatus of FIG. 1 taken at right angles thereto with portions thereof in cross section as indicated by the line II—II of FIG. 1;

FIG. 3 is a central vertical cross-sectional view on an enlarged scale through one of the extrusion and blowing tubes of the present invention taken approximately on the line III—III of FIG. 1;

FIG. 4 is a vertical central cross-sectional view through one of the extrusion orifice and blow tubes of the present invention taken at right angles to FIG. 3;

FIG. 5 is a fragmentary cross-sectional view taken in the same vertical plane as FIG. 4 showing one phase of a cycle of operation; and FIG. 6 is a view similar to FIG. 5 showing a subsequent phase of a cycle of operation.

Figure 1:
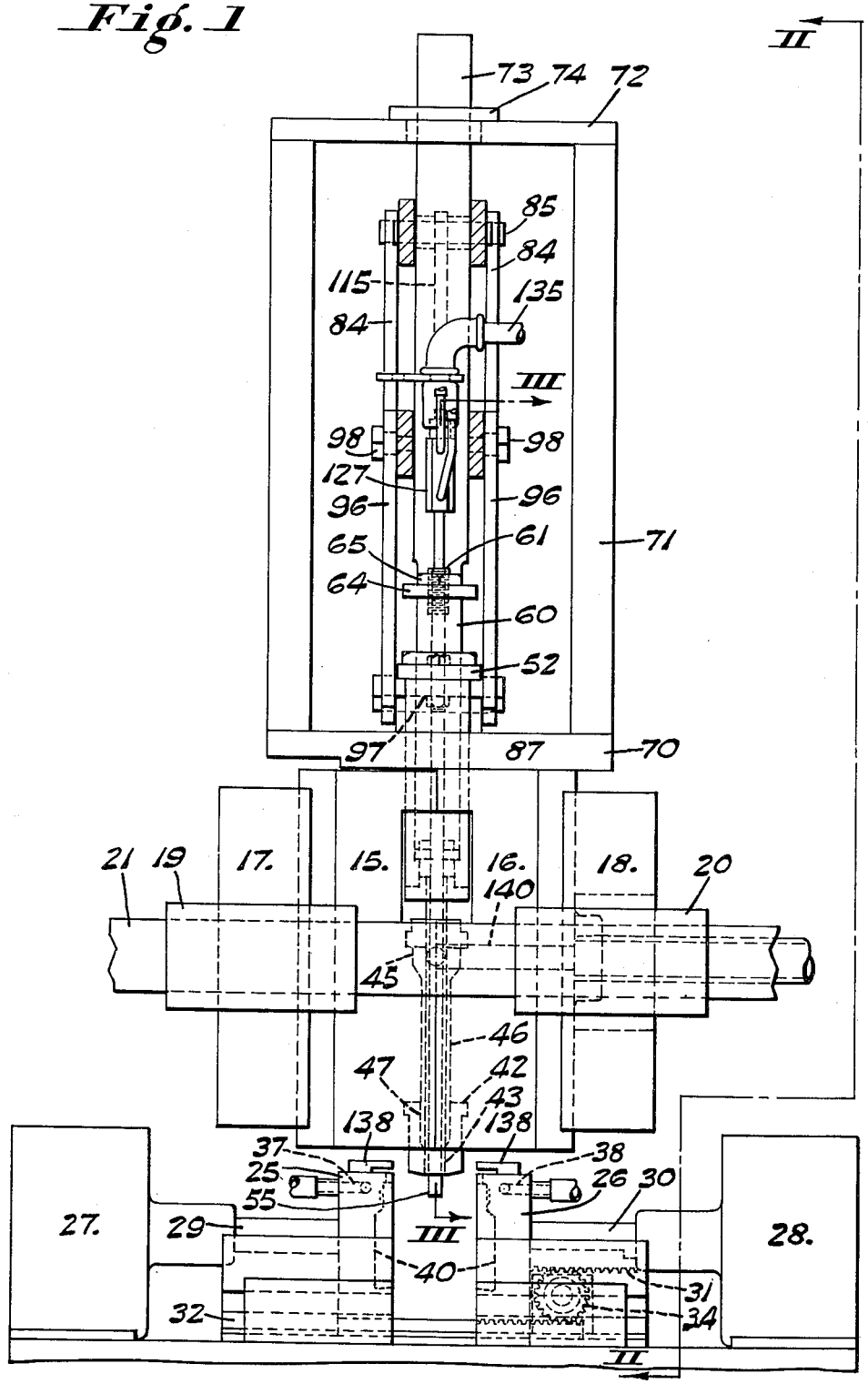
FIG. 1 is a general elevational view of one form of the apparatus of the present invention taken partly in cross section as indicated by the line I—I of FIG. 2.

In the apparatus shown herein by way of example only that portion is shown and described which is more or less peculiar to the apparatus of the present invention and enough of the surrounding and cooperating mechanism to fully illustrate the principles of the invention and to enable those skilled in the art to construct apparatus satisfactory for carrying out the method of the invention. The various movable mold parts may be operated manually, within the purview of the present invention, or semi-automatic or automatic means may be provided for producing partial or full cycles of operation, with partial manual control or manipulation or without any manual intervention. Given the apparatus and mold structure illustrated by way of example, the modification of the apparatus for manual, semi-automatic or fully automatic operation would be a mere matter of routine design to those skilled in the plastic molding and extrusion arts.

Like characters of reference denote like parts throughout the several figures of the drawings. Referring particularly to FIGS. 1 and 2, the extrusion and blowing portion of the form of apparatus illustrated herein by way of example comprises a relatively fixed structure consisting of a pair of blocks 15 and 16 which are clamped to each other by a pair of plates 17 and 18 lying at opposite sides of the blocks 15 and 16.

The plates 17 and 18 are provided with bearings 19 and 20, respectively, at oposite sides thereof, which bearings are securable to a pair of horizontal supporting bar members 21. The blocks 15 and 16 are made separately and attached as shown, mainly so that they may be disassembled for cleaning, when necessary, and for interchanging certain of the extrusion and blowing instrumentalities to adapt the apparatus for the manufacture of articles of various sizes and proportions.

The extrusion and forming apparatus shown herein by way of example is arranged for the simultaneous extrusion and formation of a pair of plastic articles and the meeting surfaces of the blocks 15 and 16 are provided with a pair of spaced vertical bores, the vertical center lines of which register with the centers of two mold cavities which will now be described.

A pair of relatively separable complementary mold parts designated 25 and 26 underlie the blocks 15 and 16 and are mounted for opening and closing movement by operation of a pair of fluid cylinders 27 and 28, respectively. Piston rods 29 and 30 extend from the cylinders 27 and 28, respectively, to operative engagement with the mold parts 25 and 26 as clearly shown in FIG. 1.

Means are preferably provided to insure synchronous opening and closing movements of the mold parts 25 and 26 and in the present instance such means comprise rack teeth 31 formed at the bottom of piston rod 30 and a rack member 32 which is fixed to mold part 25 for horizontal movement therewith. A freely rotatable pinion 34 is mounted upon a relatively fixed axis and meshes jointly with rack teeth 31 and the teeth of rack member 32.

The mold members 25 and 26 are provided with passages 37 and 38 through which a heat exchange liquid or other fluid may be circulated to cool the mold members. Each of the mold blocks 25 and 26 is provided, at their meeting surfaces, with a pair of cavities 40 which combine to form chambers or cavities for simultaneously molding a pair of containers, which in the illustrated instance are a pair of bottle elements having relatively narrow neck portions.

As indicated previously herein, the blocks 15 and 16 of the extrusion and blowing apparatus are provided with a pair of vertical bores whose axes lie in the plane of separation of the blocks 15 and 16 and these bores are axially aligned with the cavities 40 of the mold parts 25 and 26. The lower portions of these bores are enlarged and formed to receive a pair of extrusion orifice bushings 42 having central openings whereby to form an extrusion ring.

Referring particularly to FIG. 4, a tubular member or sleeve 43 has its lower end disposed generally within each of the orifice bushings 42, the lower end of each sleeve 43 having a fairly close axially sliding fit in the lower end of each of the orifice bushings 42, as shown. One of the functions of sleeve 43 is to cut off the flow of plastic material to the molding apparatus in proper timed relation with the other operating parts and accordingly the sleeve 43 shall hereinafter be referred to as the degating sleeve.

Each of the vertical bores in the blocks 15 and 16 is provided with an annular ring gate formation 45 and bore portions 46 extending downwardly therefrom are of greater diameter than the outside diameter of degating sleeve 43 to form elongated annular passageways through which plastic material is fed downwardly from the ring gates 45. The annular plastic passageways thus formed continue downwardly into the upper portions of the orifice bushings 42 as enlarged bore portions 47.

The degating sleeves 43 function to sever an extruded portion of plastic material from the parent body, as indicated above, and cooperate to form a finish at the top of each of the necks of the containers. This finish may have a flat radial upper surface or the lower end of degating sleeve 43 may be shaped to form an upper finish of any other desired form. In the form of the present invention set forth herein by way of example the degating sleeves 43 function as plastic metering members, particularly during their downward movement through the lower orifice portions of the bores in the bushings 42 following the actual cut off of plastic flow from the feed passage 46, 47.

In performing its degating functions and in cooperating to finish form the top ends of the containers the degating sleeves 43 are arranged to move vertically upwardly and downwardly in a certain sequence relationship with the operation of other parts of the extruding and forming apparatus. To this end the top ends of each of the degating sleeves is securely fitted into a collar or bushing 50 which is in turn fitted into the lower end of a cylindrical member 51. The upper ends of these cylindrical members 51 extend into and are fixed to a plate 52 and means are provided for imparting lifting and lowering movements to the plate 52 to control vertical movements of degating sleeve 43, which means will be described later herein.

A further tubular member 55 is disposed within each degating sleeve 43 and the exterior periphery of the lower portion of each tubular member 55 forms the inner periphery of the annular extrusion orifice and thus forms what is referred to later herein as an extrusion mandrel. In addition to cooperation with the lower bore portions of the orifice bushings 42 to form the annular extrusion orifices and thus provide extrusion mandrels, the tubular members 55 serve as conduits for conducting blowing air to the extruded tubes of plastic material to blow the same into conformity with the mold cavities 40. Accordingly, tubular members 55 shall hereinafter be referred to either as extrusion mandrels or blow tubes.

Each of the degating sleeve hollow cylindrical members 51 has positioned therein for vertical sliding movement, a second hollow cylindrical blow tube supporting member 60 which is provided at its upper end with a threaded nipple 61. Each blow tube 55 is pressed into its associated nipple 61 and the upper ends of the joint assemblies comprising the cylindrical members 60, the nipples 61 and the blow tubes 55 are fixed to an oblong plate member 64 by means of nuts 65 which engage the threaded nipple members 61 as shown in FIGS. 2 and 3. The plate 64 is connected for controlled vertical movement, in a manner which will presently be described, for imparting up and down movements to the blow tubes 55.

Reference will now be had to one form of mechanism for raising and lowering the degating sleeves 43 and blow tubes 55 in any desired sequence and relationship. The means herein shown are manually operable but it is to be understood that the principles of the present invention are just as applicable to machines wherein the desired sequence of raising and lowering movements of the degating sleeves and blow tubes are effected automatically and repeated in a certain set or adjusted sequence. In the form illustrated herein by way of example the control means for raising and lowering the degating sleeves 43 and blow tubes 55 comprises a superstructure mounted upon the blocks 15 and 16 of the extruding apparatus.

The manual operating mechanism and supporting structure includes a mounting plate 70 which is fixed to the upper surface of block 16 as clearly shown in FIG. 1. In the present instance mounting plate 70 is disposed slightly above the other block 15 of the extrusion apparatus so that block 15 may be removed without disturbing the superstructure for cleaning purposes or for replacing the extrusion bushings and other parts with bushings and parts of different sizes or proportions.

Four posts or column members 71 extend upwardly from the corners of mounting plate 70 and are surmounted by a top plate 72. A central shaft 73 is guided in a bushing 74 provided in top plate 72 and is threaded at its lower end as at 75. The reduced threaded lower end portion 75 of shaft 73 extends through an opening in the plate 64 which is rigidly connected with the upper ends of the cylindrical members 60 which mount the blow tubes 55 and a nut 76 fixes the lower end of shaft 73 with respect to plate 64, all as shown in FIG. 2.

A pair of manual operating levers 80 are pivotally connected to shaft 73 as at 81 and are also pivotally connected at their rear portions with a pair of vertical links 84 as at 85. The bottom ends of links 84 are pivotally connected as at 86 with a fixed bracket 87 which is mounted upon the base plate 70 of the superstructure. From the foregoing it will be seen that manual vertical manipulation of the left-hand end of either of the levers 80 as viewed in FIG. 2 will serve to raise and lower blow tubes 55 jointly.

Means are provided whereby the degating sleeves 43 may be raised and lowered together but independently of the blow tubes 55 and also may be moved downwardly jointly with the blow tubes at a proportionate speed or distance with respect to the movement of the blow tubes. For this general purpose a pair of degating sleeve operating levers 90 are pivotally connected at one end as at 91 to a pair of vertical links 92 which are in turn pivotally attached at their lower ends to bracket 87 as at 93. A pair of generally vertical links 96 are fixed at their lower ends to a cross pin 97 which is bolted to the plate member 52 which connects with the upper ends of the degating sleeve cylindrical members 51. The upper ends of links 96 are pivotally connected to the pair of levers 90 for operating the degating sleeves as at 98.

The left-hand ends of levers 90, as viewed in FIG. 2, are pivoted to a verticaly disposed rack member 100 as at 101. Rack member 100 is guided for vertical movement between a pair of plate members 102 and 104 which are supported against the front of the superstructure by screwing thereto or otherwise, the plate members 102 and 104 being mounted in spaced relation to support rack member 100 for vertical sliding movement.

A pinion 107 which meshes with rack 100 is mounted on a rock shaft 108 which is journaled in the front posts or columns 71 as shown in FIG. 2 and a manual operating arm 109 fixed to the outer end of rock shaft 108 is operable to rotate pinion 107 and thus manually move the links 96 and the degating sleeve parts in either direction vertically.

In the manual form of apparatus shown herein by way of example a link 115 is pivotally attached at its upper end as at 116 to the levers 80 and is bifurcated at its lower end as at 117. The bifurcation 117 engages over a pin 118 which extends between the levers 90 and thus establishes a play connection between levers 80 and levers 90. Upward movement of levers 80 is not transmitted to levers 90 but downward movements of levers 80 beyond a predetermined amount result in a proportionate downward movement of levers 90, the downward movement of the levers 90 being less in degree than the causing downward movements of levers 80 in any desired proportion depending on the location of the vertical link 115 along levers 80 and levers 90. If entirely independent movement of the degating sleeves is desired, the play connection may be eliminated by merely moving levers 80 and 90 apart sufficiently to lift the bifurcation 117 from pin 118.

Under certain conditions of operation it is desirable to cool the lower ends of the blow tubes 55 and to this end water circulating tube assemblies are inserted in the blow tubes to be carried thereby in the vertical reciprocation of the blow tubes, the water tube assemblies projecting above the blow tubes in the present instance for connection with a circulating water heat exchange medium. Further, in the present instance, the blowing air, the transmission of which is one of the main functions of the blow tubes 55, is actually conducted within and through the water cooling tube assembly in a manner which will presently appear.

The heat exchange tube assemblies for cooling the blow tubes 55 each comprise a series of three coaxial tubular members spaced from each other to provide two annular passages therebetween. Referring to FIG. 3, the three tubular members of the heat exchange tube assembly comprise an outer tube 120, an inner tube 121, and an intermediate tube 122. The lower ends of the outer and inner heat exchange tubes 120 and 121 are received within and supported by a ferrule member 125 which fits fairly snugly within the lower portion of its associated blow tube 55.

The ferrule member 125 is provided with stepped coaxial bores for receiving the outer and inner heat exchange tubes 120 and 121. The inner tube 121 fits snugly in the lower end portion of ferrule member 125 and the outer tube 120 fits snugly within the upper end of ferrule member 125. The intermediate tube 122 extends downwardly in an intermediate bore portion of ferrule member 125 but is spaced therefrom both at its inner and outer peripheries and at its lower end.

The upper ends of the several heat exchange tubes are received snugly within stepped bores formed in a cylindrical connection member 127. The upper ends of the heat exchange tubes are stepped as to length at both ends as clearly shown in FIG. 3 and the stepped bores in connection member 127, in addition to the bores which directly receive the ends of the tubular members 120, 121 and 122, include stepped bore portions 128 and 129 which form annular upper entrance passages to the spaces between the outer tube 120 and intermediate tube 122 and the intermediate tube 122 and the inner tube 121, respectively.

Cooling water inlet and outlet conduits 130 and 131 communicate with the stepped bore portions 128 and 129, respectively, and it will be seen from the foregoing that cooling water entering at conduit 130 will pass downwardly between the outer tube 120 and intermediate tube 122, around the bottom end of intermediate tube 122, thence upwardly between intermediate tube 122 and inner tube 121, and thence outwardly through passage 129 and discharge conduit 131. The cooling effect thus imparted to ferrule member 125 is conducted to the contiguous lower portion of the associated blow tube 55.

The inner heat exchange tube 121 serves as the conduit for blowing air and is provided at its upper projecting end with an air connection 135 as shown in FIG. 1. In instances where the heat exchange tubes are not employed the air connection will be made directly to the tops of the blow tubes 55. The heat exchange tube assemblies, each comprising a ferrule member 125, a connection member 127 and the three heat exchange tubes carried thereby, are vertically adjustable within each blow tube 55 to vary the cooling effect on the lower end of the blow tube. By moving the ferrule member upwardly within the blow tube 55 the cooling effect at the lower end of the blow tube is reduced.

A pair of centering plates 138 are positioned at the tops of the mold parts 25 and 26 and are provided with half round cutouts at their meeting edges, as viewed in plan, of the same outside radius as the radius of the lower ends of the orifice bushings 42 and concentric therewith. Thus closing movement of the mold parts causes the cutouts in plates 138 to embrace the orifice bushings 42 to insure accurate axial alignment of the extrusion apparatus and the mold parts.

A complete extrusion and blowing cycle of operation according to the present method in one form will now be described. In this connection it is to be noted, as mentioned previously herein, that the mechanism described for manually effecting vertical movements of the blow tubes and the degating sleeves has been by way of example only and that the following description will be directed only to the functional vertical movements of the blow tubes and the degating sleeves without particular reference to the manner in which those movements are brought about.

The cycle of operation about to be described and a number of variations thereof have been successfully practiced with the manual control means illustrated particularly in FIG. 2 of the drawings and a large number of satisfactory containers have been produced thereby. However, as stated in the preamble hereto, it is to be understood that the movements referred to in the following description may be part of an automatic sequence of operation which may be reproduced by cam operation of the blow tube and degating sleeve movements or by fluid cylinder operation thereof or a combination of both or by any other of the well known mechanical power means for reproducing cycles of operation in machines of this general class.

In describing a specific cycle of operation by way of example reference will be had particularly to FIGS. 5 and 6. As shown in FIG. 5 degating sleeve 43 is raised to provide an open annular path for the downward flow of plastic material through orifice bushing 42 and blow tube 55 is shown with its lower end substantially at the plane of the lower end of the extrusion bushing 42.

With the parts in this position plastic is fed inwardly through a sprue 140, thence laterally through branch passages leading to the two ring gates 45, and thence downwardly.

The manner in which the plastic material is forced through the feed passages at this cycle of operation forms no part of the present invention and in the manual mechanism illustrated in the drawings may be effected, as is common in manually operated plastic molding machines of conventional form, by manual actuation of a pressure injection piston, or in any other desired manner.

The apparatus illustrated in the drawings by way of example and described above includes two sets of extrusion and blowing instrumentalities and two mold cavities whereby each cycle of operation produces two complete articles. In the following description, in the interests of simplicity, the method will be described as if only one article were being produced and therefore reference will be had to the various parts of only one set of extrusion, blowing and forming parts. In any event the number of articles made in each cycle of operation and the number of mold cavities provided, whether one, two or more, is immaterial to the principles of the present invention.

The following description of the method has reference to certain dimensions in referring to movements of the blow tube and the degating sleeve. These references are merely representative and by way of disclosing one specific and fully operative method. Nevertheless, in the interests of such full disclosure it may be stated that the containers blown in the apparatus described, in the specific example set forth in the application, have generally rectangular body portions about one and three-quarter inches high, about one and one-half inches wide and about three-quarters of an inch thick and the generally cylindrical neck portions are about three-quarters of an inch high and about one-half inch outside diameter.

In the method which is now being set forth by way of example a tube of plastic material is extruded until it approaches the bottom of the cavity 40 of the blow mold, say within one half or three quarters of an inch, as indicated generally in FIG. 5. At this time the forcible injection of plastic material through the sprue 140 and the ring gates 45 is terminated.

It will be noted that the extruded tube flares outwardly below the extrusion orifice, this flaring being a natural phenomenon or incident of the extrusion of plastic material in the foregoing manner. If the mold parts 25 and 26 were closed on the extruded tube of FIG. 5, the constricted neck or finish parts of the mold would pinch the flaring part of the extruded tube and an unsatisfactory product would result.

At this point in the exemplary method and before closing of the mold parts the blow tube 55 is lowered and, in the present instance, such lowering movement may be accompanied by a lesser downward movement of degating sleeve 43. By way of example this downward movement of the blow tube 55 may be about one and one quarter inches with an accompanying downward movement of the degating sleeve of something less than one inch.

This downward movement of the degating sleeve 43 pumps plastic material out of the extrusion orifice and at the same time the greater downward movement of the blow tube 55 draws the extruded tube downwardly to attenuate the same, thus producing a tube whose upper portion is thinner walled than the thickness of the extrusion orifice with the tube hugging the blow tube closely from the extrusion orifice downwardly to a point near the bottom of the blow tube where the extruded tube flares outwardly to a larger diameter as shown in FIG. 6.

At this time the mold parts have not yet closed as shown in FIG. 6 but the bottom end of the extruded tube has moved below the bottom of the mold cavity a sufficient distance to cause the bottom of the extruded tube to be pinched and thus closed at the bottom edge of the mold cavity upon closure of the mold parts.

Reference to downward movement of one and one quarter inches in the movement of the blow tube 55 is by way of example only. This downward movement will vary with the kind of plastic material being used, the degree of plasticity, the temperature of the material, the rate of heat dissipation, the physical proportions of the article being formed, and other circumstances and conditions. The critical thing is that the blow tube moves down such a distance that the flare of the extruded tube is below the lowest part of the generally cylindrical portion of the neck or finish mold to avoid the pinching referred to above upon closure of the mold parts.

It will be noted that, before blow tube 55 is moved downwardly at all, the flare of the extrusion tube begins at the bottom of the extrusion orifice which is then level with the bottom of the blow tube, so that the top of the flare moves upwardly along the blow tube during downward movement of the blow tube. This may be due to sliding of the extruded tube above the flare along the blow tube during this downward movement or the extent of the flare along the tube may increase during such operation. Whatever the reason, due allowance for this must be made in determining the relative movements of the parts and the proportioning of the extrusion as to length in various phases of its formation.

The foregoing variables and others will affect the required or desirable degrees and proportionings of such downward movements of the blow tube and the degating sleeve in properly forming and positioning the extrusion before the subsequent molding operation. The foregoing downward movement of degating sleeve 43 in the present instance brings the lower surface of the same down to or slightly into the top of the neck portion of the cavity whereby the finish of the bottle or other container is substantially fully molded in the top finish mold defined by the neck portion of the cavity, the exterior periphery of the blow tube, and the lower end of the degating sleeve 43.

The foregoing describes a method of forming the finish of the container which is preferred in many cases. However, the finish need not be formed completely and finally in this manner, particularly in the case of wide mouth bottles where it is desirable to extrude a tube somewhat smaller than the neck of the container. Since the extruded tube flares outwardly and downwardly as an inevitable result of conventional extrusion methods and the nature of the plastic material, if the extrusion diameter exceeds certain limits with respect to the outside diameter of the bottle there is danger that the lower peripheral portion of the extruded tube will be pinched along the sides at the lower portions of the mold cavity upon closure of the mold.

To keep within tolerable extrusion diameters with wide mouth ware it will be found desirable to provide a temporary blowing neck of relatively small diameter at the top end of the container, the actual neck of the finished bottle underlying the blowing and extruding neck and constituting an enlargement thereof and being blown as a part of the body of the bottle in the body cavity of the mold. In such cases the false or temporary neck and the material connecting it to the neck proper will be severed from the container proper in completing the fabrication of the same.

The downward movement of the blow tube described above to avoid pinching is desirable but not absolutely essential since pinching of moderate degree in certain types of ware can be tolerated or removed after forming.

At the point in the present method described above the mold parts 25 and 26 close and pinch the bottom of the extruded tube at the bottom edge of the mold cavity to close off the extruded tube as shown in FIG. 6. If the finished container were formed at this time by introducing blowing air through the blow tube 55, the shoulder portion of the container might be unduly thin due to the fact that the flare of the extruded tube is substantially below the bottom end of the neck portion of the mold cavity and the smaller proportions of the tube above the flare will result in undue attenuation of the wall thereof in blowing to form the shoulder portion of the container.

In general it will be necessary or desirable in the preceding step, wherein the blow tube is moved downwardly, to move the flare portion substantially below the bottom of the neck cavity to insure against pinching upon closure of the mold. Accordingly, it will normally be desirable at this time, following closing of the mold parts, to raise the blow tube 55 about a quarter of an inch or in any event enough to effect contact of the flare portion of the tube with the top of the blow cavity or the bottom of the cylindrical part of the neck mold, what may be referred to as the shoulder portion of the mold.

During this movement the degating sleeve 43 may be locked against any vertical movement. Following this raising of the blow tube, if such raising is practiced, or in any event following the closing of the mold parts, blowing air will be introduced downwardly through the blow tube 55 to blow the body portion of the container into fully molded conformity with the body mold cavity.

Just prior to the lifting of the blow tube referred to above the degating sleeve 43 may be moved downwardly a slight amount to finally and cleanly form the finish of the container. The degree of such downward movement will vary with different kinds of containers and materials and in any event the neck portion of the mold cavity will be designed to extend above the top of the finished article a sufficient degree to permit the desired degree of entering movement of the lower end of the degating sleeve into the neck mold cavity.

Following the initiation of the blowing operation the blow tube 55 may be raised, either suddenly or gradually, to a point where its bottom end is either somewhat below or somewhat above the bottom end of the degating sleeve 43. It is not essential to raise the blow tube 55 at this phase of operation but such raising tends to insure filling of the neck mold, both as to thread openings and the top finish and the raising also facilitates removing the blow tube from the finished article.

The alternative function of the filling of the neck mold threads and the top finish by this raising of the blow tube is to some extent supplementary to or interchangeable in whole or in part with the above mentioned final lowering of the degating sleeve 43. That is, such final lowering of the degating sleeves accomplishes or contributes to much the same result as to the final forming of the top finish and the filling of the thread cavities of the neck mold.

These two expedients may be used alternatively or both may be used to contribute to the same general objects and, under certain conditions of operation, neither of these steps may be required to fill the neck mold cavity completely. As a further alternative, the lowering of the degating sleeve may take place in conjunction with this latter raising of the blow tube at the phase of the manufacturing cycle which is now being described, namely, the step following the blowing of the article.

In a further alternative procedure, the tube may be raised rapidly to its terminal position wherein its bottom end is substantially level with the bottom end of the orifice bushing in which case the blowing pressure in the interior of the container will blow the threads into the thread cavities of the neck mold. In fact, this blowing pressure may fill the thread cavities without or before such upward movement of the blow tube and with the blow tube in position in the neck or finish opening by passage of air around the outer periphery of the lower portion of the blow tube.

What is claimed is:

1. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving the cylindrical extrusion mandrel through the extrusion orifice in the direction of extrusion to move said flaring tube portion beyond the neck cavity, and closing the mold means on said extruded tube.

2. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving the cylindrical extrusion mandrel through the extrusion orifice in the direction of extrusion to move said flaring tube portion beyond the neck cavity, closing the mold means on said extruded tube, and moving the extrusion mandrel in an opposite direction to move the flaring portion of the tube toward the neck cavtiy.

3. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving a sleeve member axially into the annular space between the extrusion orifice and the extrusion mandrel to sever the extruded tube from the parent body of plastic material and form a finish at the outer end of the neck portion of the article and moving the cylindrical extrusion mandrel through the extrusion orifice in the direction of extrusion to move said flaring tube portion beyond the neck cavity, and closing the mold means on said extruded tube.

4. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving a sleeve member axially into the annular space between the extrusion orifice and the extrusion mandrel to sever the extruded tube from the parent body of plastic material and form a finish at the outer end of the neck portion of the article and moving the cylindrical extrusion mandrel through the extrusion orifice in the direction of extrusion to move said flaring tube portion beyond the neck cavity, said two movements being at least partly simultaneous, and closing the mold means on said extruded tube.

5. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving a sleeve member axially into the annular space between the extrusion orifice and the extrusion mandrel to sever the extruded tube from the parent body of plastic material and form a finish at the outer end of the neck portion of the article and moving the cylindrical extrusion mandrel through the extrusion orifice in the direction of extrusion to move said flaring tube portion beyond the neck cavity, closing the mold means on said extruded tube, and moving the extrusion mandrel in an opposite direction to move the flaring portion of the tube toward the neck cavity.

6. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving the cylindrical extrusion mandrel through the extrusion orifice in the direction of extrusion to move said flaring tube portion beyond the neck cavity, closing the mold means on said extruded tube, and introducing a pressure fluid through said extrusion mandrel to blow the closed ended extruded tube into conformity with said mold space.

7. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving the cylindrical extrusion mandrel through the extrusion orifice in the direction of extrusion to move said flaring tube portion beyond the neck cavity, closing the mold means on said extruded tube, moving the extrusion mandrel in an opposite direction to move the flaring portion of the tube toward the neck cavity, and introducing a pressure fluid through said extrusion mandrel to blow the closed ended extruded tube into conformity with said mold space.

8. A method of forming from plastic material hollow articles having body portions and neck portions, said method comprising forcing the material through an extrusion orifice with a cylindrical extrusion mandrel disposed in said orifice to extrude a tube of plastic material to be formed in a mold space having a neck cavity portion and an enlarged body cavity portion, said extruded tube flaring outwardly beyond the extrusion orifice, moving a sleeve member axially into the annular space between the extrusion orifice and the extrusion mandrel to sever the extruded tube from the parent body of plastic material and form a finish at the outer end of the neck portion of the article and moving the cylindrical extrusion mandrel through the extrusion orifice in the direction of extrusion to move said flaring tube portion beyond the neck cavity, closing the mold means on said extruded tube, and introducing a pressure fluid through said extrusion mandrel to blow the closed ended extruded tube into conformity with said mold space.

9. A method of forming hollow articles from plastic material which method comprises forcing the material through extrusion means having an external extrusion orifice and a cylindrical internal axially movable extrusion mandrel to extrude a tube of said material to be formed in a mold space, and moving the cylindrical extrusion mandrel through the extrusion orifice in the direction of extrusion to attenuate the extruded tube.

10. A method of forming from plastic material hollow articles having open end portions which method comprises forcing the material through extrusion means having an external extrusion orifice and an internal axially movable cylindrical extrusion mandrel to extrude a tube of said material to be formed in a mold space and moving the cylindrical extrusion mandrel through the extrusion orifice during at least a part of the extruding step in the direction of extrusion and at a faster rate than the rate of extrusion.

11. A method of forming hollow articles from plastic material, said method comprising forcing the material through an extrusion orifice with a cylindrical extrusion mandrel disposed in said orifice to extrude a tube of plastic material, moving the cylindrical extrusion mandrel in the direction of extrusion to attenuate the extruded tube, and moving a sleeve member axially into the annular space between the extrusion orifice and the cylindrical extrusion mandrel to sever the extruded tube from the parent body of plastic material and form the open end of a hollow article.

References Cited in the file of this patent

UNITED STATES PATENTS

| | | |
|---|---|---|
| 2,175,053 | Ferngren | Oct. 3, 1939 |
| 2,262,612 | Kopitke | Nov. 11, 1941 |
| 2,288,454 | Hobson | June 30, 1942 |
| 2,515,093 | Mills | July 11, 1950 |
| 2,632,202 | Haines | Mar. 24, 1953 |
| 2,674,006 | Bailey et al. | Apr. 6, 1954 |
| 2,706,308 | Lorenz | Apr. 19, 1955 |
| 2,724,860 | Strong | Nov. 29, 1955 |

FOREIGN PATENTS

| | | |
|---|---|---|
| 1,030,004 | France | Mar. 11, 1953 |
| 700,984 | Great Britain | Sept. 11, 1950 |